United States Patent
Wiegand

(10) Patent No.: US 10,627,289 B1
(45) Date of Patent: Apr. 21, 2020

(54) RAMAN SIGNAL POSITION CORRECTION USING RELATIVE INTEGRATION PARAMETERS

(71) Applicant: Kaiser Optical Systems Inc., Ann Arbor, MI (US)

(72) Inventor: Patrick Wiegand, Pinckney, MI (US)

(73) Assignee: Kaiser Optical Systems Inc., Ann Arbor, MI (US)

(*) Notice: Subject to any disclaimer, the term of this patent is extended or adjusted under 35 U.S.C. 154(b) by 5 days.

(21) Appl. No.: 16/165,057

(22) Filed: Oct. 19, 2018

(51) Int. Cl.
   *G01J 3/44* (2006.01)
   *G01J 3/18* (2006.01)
   *G01N 21/65* (2006.01)

(52) U.S. Cl.
   CPC .......... *G01J 3/4412* (2013.01); *G01J 3/1838* (2013.01); *G01N 21/65* (2013.01); *G01N 2201/121* (2013.01)

(58) Field of Classification Search
   CPC ...... G01J 3/4412; G01J 3/1838; G01N 21/65; G01N 2201/121
   USPC ......................................................... 356/301
   See application file for complete search history.

(56) References Cited

U.S. PATENT DOCUMENTS

| | | | | |
|---|---|---|---|---|
| 5,121,443 A * | 6/1992 | Tomlinson | ......... | G01N 30/8624 210/656 |
| 6,438,499 B1 * | 8/2002 | Hayashi | ............. | G01N 30/8624 702/30 |
| 7,141,022 B1 | 11/2006 | Don et al. | | |
| 7,142,296 B2 * | 11/2006 | Cunningham | ........ | B01L 3/5085 356/326 |
| 8,428,889 B2 | 4/2013 | Wright | | |
| 2006/0009917 A1 * | 1/2006 | Le Cocq | .............. | G01N 21/253 702/20 |
| 2006/0208191 A1 * | 9/2006 | Kessler | ..................... | F26B 5/06 250/339.13 |
| 2007/0136014 A1 * | 6/2007 | Neiss | ..................... | G01N 21/65 702/76 |
| 2011/0086796 A1 * | 4/2011 | Wang | ................... | C12Q 1/6883 514/1.5 |

(Continued)

FOREIGN PATENT DOCUMENTS

WO     2010047916 A1     4/2010

OTHER PUBLICATIONS

OriginLab Manual, Peak Analyzer Algorithms, http://www.originlab.com/doc/Origin-Help/PA-Algorithm (last accessed Oct. 19, 2018).

(Continued)

*Primary Examiner* — Sunghee Y Gray
(74) *Attorney, Agent, or Firm* — Christopher R. Powers; PatServe

(57) ABSTRACT

An improved method for integrating curve peaks as compared to techniques such as the trapezoidal rule wherein integration parameters are at fixed x-axis positions. Integration parameters are instead specified relative to a peak center, which allows the peak to shift over time due to hardware changes, temperature fluctuation, pressure changes, etc., while maintaining integration parameters at optimal locations for that peak. As such, the present disclosure finds particular utility in spectroscopy wherein, in the case of Raman spectroscopy, for example, specific wavenumber shift locations may drift over time, leading to inaccurate results based upon absolute integration parameters.

20 Claims, 9 Drawing Sheets

(56) References Cited

U.S. PATENT DOCUMENTS

2012/0010105 A1* 1/2012 Caracci ............... G01N 35/028
　　　　　　　　　　　　　　　　　　　　　　　506/12

OTHER PUBLICATIONS

O'Haver, Tom, "A Pragmatic Introduction to Signal Processing", http://terpconnect.umd.edu/~toh/spectrum/Integration.html (last accessed Oct. 19, 2018).

Steffen, B, Muller, KP, Komenda, M, Koppmann, R, Schaub, A., "A new mathematical procedure to evaluate peaks in complex chromatograms", J Chromatography A, Elsevier, 1071 (2005) 239-246.

Chromatographic Peak Integration Procedures, Standard Operating Procedures, SERAS, SOP1001, Jan. 10, 2000.

* cited by examiner

RAMAN SIGNAL POSITION CORRECTION USING RELATIVE INTEGRATION PARAMETERS

TECHNICAL FIELD

The present disclosure relates generally to curve integration and, in particular, to integration methods that use relative, as opposed to absolute, integration parameters.

BACKGROUND

A common operation in signal processing is signal integration. Such an operation may be depicted by a plot in which the x-axis represents either time or a parameter which affects the signal intensity, which may be referred to as the y-axis response, as shown in FIG. 1. To recover the entire signal, the y-axis signal intensity is summed along a section of the x-axis. This type of integration is commonly referred to as the "trapezoid rule."

Another approach to integration is through the use of curve fitting. In this method, as depicted in FIG. 2, a section of the intensities along the x-axis is examined, and a mathematical formula is used to iteratively make a combined curve of the shape matching a signal 202. A curve area 208 is then determined by summing the areas of the iterative mathematical functions 204, 206.

The trapezoidal rule method is somewhat simpler to implement for digitized signals when the desired signal is isolated because no assumptions are made concerning the underlying mathematical functions that describe the peak. In such a case, baseline points are defined such as to be outside the signal boundaries, and signal summation is carried out at points equal to or internal to a baseline region, as shown in FIG. 3. In FIG. 3, outer lines 302, 304 denote baseline start and stop points, respectively, and inner lines 306, 308 denote integration start and stop points, respectively. A net signal 310 is the light shaded area after a baseline area 309 has been subtracted.

In certain signal processing applications, however, it is possible for peak positions associated with measured quantities to shift slightly. Such a shift may be caused by environmental temperature change over time that change the physical position of components within a spectrometer. Specific to Raman spectroscopy, the excitation laser wavelength (i.e., wavenumber) may drift over time. Aside from these instrumental effects, the molecular nature of Raman spectroscopy may cause peaks to shift due to composition changes in a mixture and/or temperature changes of the sample. In conventional signal integration, the baseline and integration limits remain constant, but the peak may shift relative to the integration limits to such an extent that the integration limits are no longer optimal, resulting in errors in determining a concentration of a constituent of a sample under test. Accordingly, there exists a need for curve integration techniques that do not rely on absolute parameters.

SUMMARY

The present disclosure is broadly directed to alternatives to trapezoidal rule integration for determining constituent concentration using spectroscopy. In one aspect of the present disclosure, a method of improving the accuracy of a Raman spectrometer comprises providing a Raman spectrometer including: an optical grating operative to separate a Raman signal received from a sample into a Raman spectrum including at least one peak representative of a molecular constituent present in the sample; an optical detector having a plurality of detector elements configured to receive the Raman spectrum; and a processor operative to receive an electrical signal representative of the Raman spectrum from the optical detector in the form of a curve, the curve including the at least one peak having x- and y-coordinates, wherein the processor is configured to integrate the at least one peak. The method further comprises using the spectrometer to perform the following operations: receiving data representative of a standard Raman spectrum for the molecular constituent including a nominal peak maximum y-value and an x-coordinate associated with the nominal peak maximum y-value; specifying a window relative to an x-axis that includes the x-coordinate of the nominal peak maximum y-value; defining a baseline start point on the x-axis as an x-coordinate of a peak less a first predetermined offset; defining a baseline stop point on the x-axis as the x-coordinate of the peak plus the first predetermined offset; defining an integration start point on the x-axis as the x-coordinate of the peak less a second predetermined offset; defining an integration stop point on the x-axis as the x-coordinate of the peak plus the second predetermined offset; receiving data representative of a sample Raman spectrum from the spectrometer, wherein the sample spectrum includes at least one sample peak associated with the molecular constituent present in the sample, and wherein the sample peak may have a relative shift of the x-axis with respect to the detector elements compared to the standard spectrum; determining an actual maximum y-value of the at least one sample peak of the sample spectrum and an x-coordinate associated with the actual maximum y-value; computing the baseline start point, the baseline stop point, the integration start point and the integration stop point for the sample spectrum for integrating the sample peak by subtracting and adding the first and second predetermined offsets as defined; computing a y-value of the curve including the sample peak and a y-value of a baseline at each of a plurality of points between the integration start point and the integration stop point; subtracting the baseline y-values from the y-values of the curve computed at each of the plurality of points between the integration start point and the integration stop point; and adding the results of the baseline subtractions to compute a net peak area representative of the molecular constituent present in the sample.

In an embodiment, the nominal peak maximum y-value and the x-coordinate associated with the nominal peak maximum y-value are based upon previously obtained data. In another embodiment, the step of computing the actual maximum y-value of the at least one sample peak includes determining an absolute maximum. In an alternative embodiment, the step of computing the actual maximum y-value includes using a cubic spline or other curve-fitting method. In an alternative embodiment, the step of computing the actual maximum y-value includes using a center-of-gravity method.

In another aspect of the present disclosure, an improved Raman spectrometer, comprises an input for receiving an optical Raman signal from a sample; an optical grating operative to separate the Raman signal into a sample Raman spectrum including at least one peak representative of a molecular constituent present in the sample; an optical detector having a plurality of detector elements configured to receive the sample spectrum; and a processor configured to receive an electrical signal representative of the sample spectrum from the optical detector in the form of a curve including the at least one peak having x- and y-coordinates. In such an embodiment, the processor is further configured to integrate the at least one peak by performing the method. The processor is further configured to receive data representative of a standard Raman spectrum including a nominal peak maximum y-value for the molecular constituent and the x-coordinate associated with the nominal peak maximum y-value; specify a window relative to an x-axis that includes the x-coordinate of the nominal peak maximum y-value; define a baseline start point on the x-axis as an x-coordinate of a peak less a first predetermined offset; define a baseline stop point on the x-axis as the x-coordinate of the peak plus the first predetermined offset; define an integration start point on the x-axis as the x-coordinate of the peak less a second predetermined offset; define an integration stop point on the x-axis as the x-coordinate of the peak plus the second predetermined offset; receive an electrical signal representative of the sample spectrum of the sample including the at least one peak for the molecular constituent, which may have a relative shift of the x-axis compared to the standard spectrum; determine an actual maximum y-value of the at least one peak and an x-coordinate associated with the actual maximum y-value; determine the baseline start point, the baseline stop point, the integration start point and the integration stop point for the sample spectrum for integrating the at least one peak by subtracting and adding the first and second predetermined offsets as defined; determine a y-value of the curve including the at least one peak and a y-value of a baseline at each of a plurality of points between the integration start point and the integration stop point; subtracting the baseline y-values from the y-values of the curve determined at each of the plurality of points between the integration start point and the integration stop point; and adding the results of the baseline subtractions to determine a net peak area representative of the molecular constituent present in the sample.

In an embodiment, the data representative of the standard spectrum including the nominal peak maximum y-value for the molecular constituent and the x-coordinate associated with the nominal peak maximum y-value are based upon previously obtained data. In another embodiment, the actual maximum y-value of the at least one peak is an absolute maximum. In a further embodiment, the processor is further configured to determine the actual maximum y-value using a cubic spline or other curve-fitting method. In an alternative embodiment, the processor is further configured to determine the actual maximum y-value of the peak using a center-of-gravity method.

DETAILED DESCRIPTION

Figure 1:
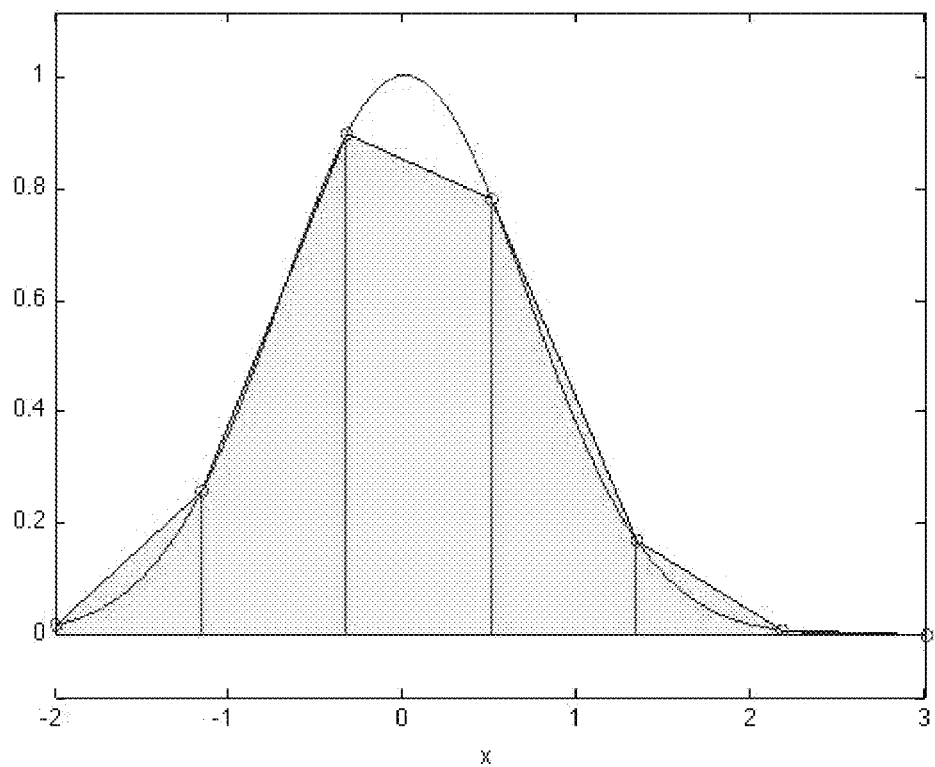
FIG. 1 is a plot depicting signal integration by summing along the x axis, according to the prior art.
Figure 2:
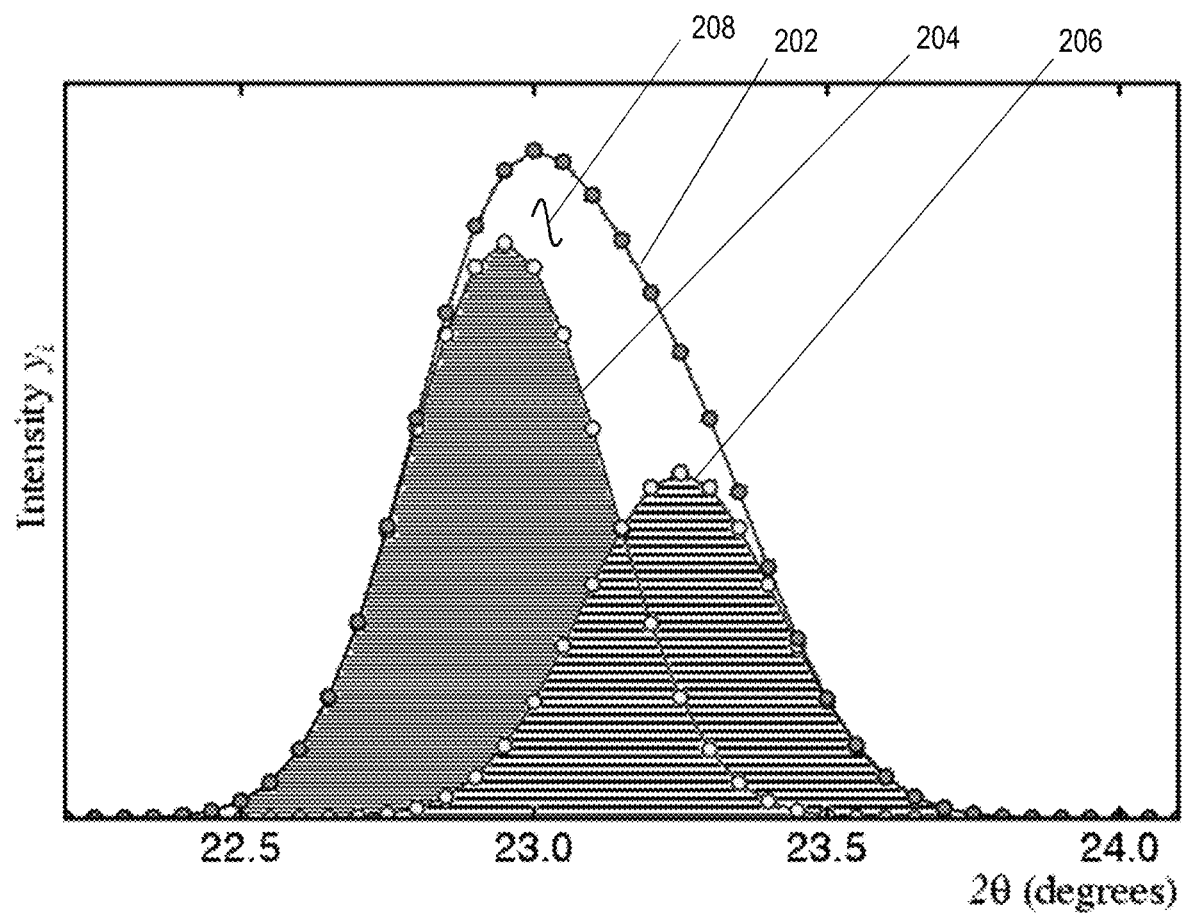
FIG. 2 illustrates a curve-fitting example wherein two functions are summed to approximate a signal, according to the prior art.
Figure 3:
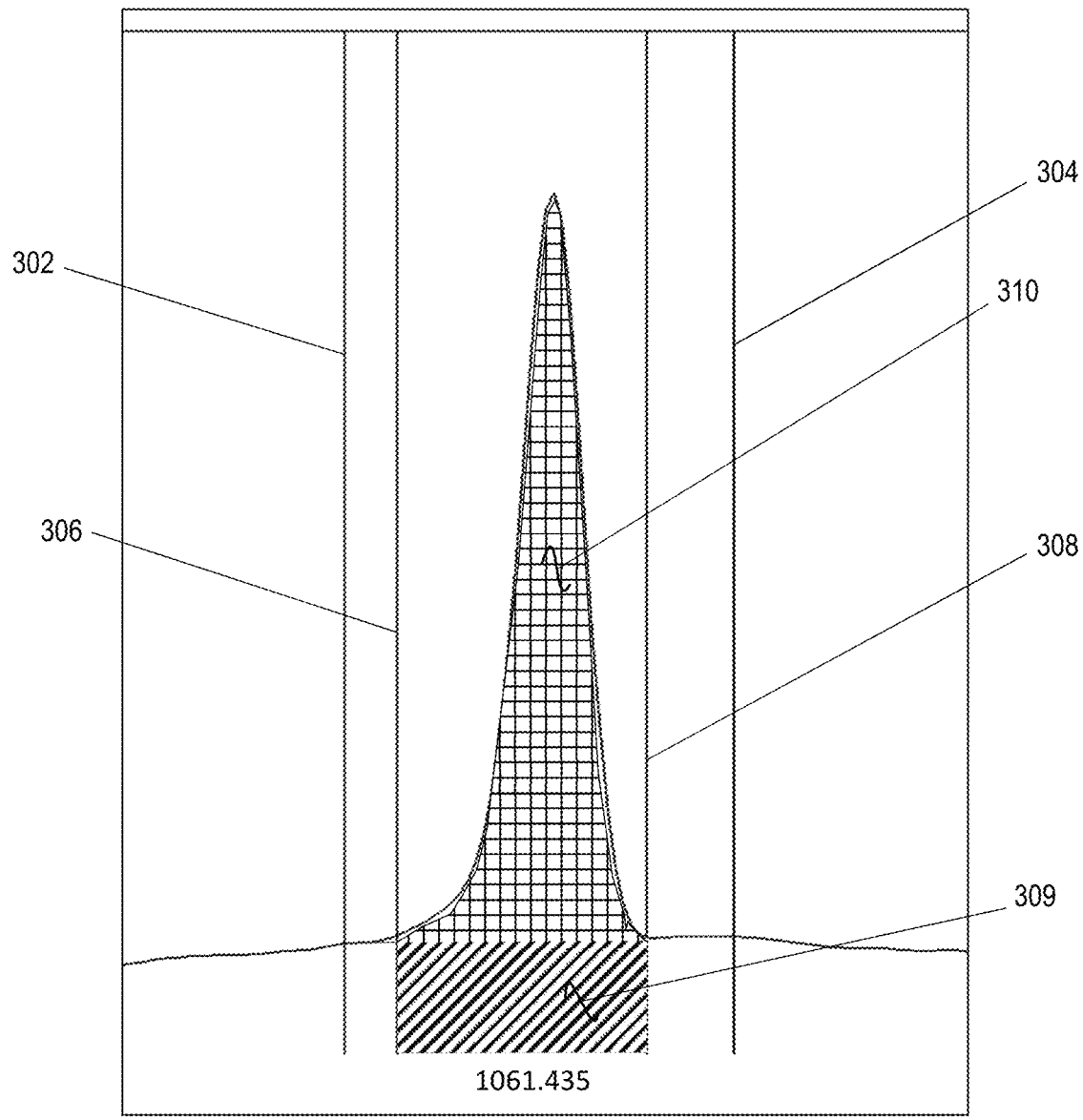
FIG. 3 illustrates the trapezoidal rule applied to an isolated peak with baseline subtraction, according to the prior art.

The present disclosure resides in variations of the conventional trapezoidal rule used for signal integration for determining constituent concentration using spectroscopy. In one aspect of the present disclosure, rather than specify the baseline and integration parameters as absolute positions on the x-axis (e.g., fixed and predefined by predetermined wavenumbers), the baseline and integration parameters are specified as offsets from an actual peak maximum within a window of data. With the approach of the present disclosure, where a constituent peak shifts over time, for example, the baseline and integration parameters are adapted and remain appropriate at least with respect to integration. While the present disclosure is applicable to a wide variety of time-varying signal integration problems, the disclosed methods find particular utility in spectroscopy wherein, in the case of Raman spectroscopy, for example, specific wavenumber shift locations may drift over time, leading to inaccurate determination of constituent concentration when based upon conventional absolute integration parameters. The apparatus and methods of the present disclosure find utility in spectroscopic analysis, wherein collected spectra may experience a relative shift of the x-axis compared to a standard spectrum.

In accordance with the present disclosure, a window of wavelengths or wavenumbers is specified with respect to a data curve that includes a peak maximum value of a constituent within a sample under test. In an embodiment, an initial peak maximum value may be determined based upon previous experience or results. Start and stop baseline values are specified as a set of offsets relative to the peak maximum value, and integration start and stop values are specified as a different set of offsets relative to the peak maximum value.

The integration start and stop values may be less than the baseline values such that the integration window is within the baseline start and stop values. An actual peak maximum is determined using one of several suitable methods including, but not limited to, absolute maximum, cubic spline fit, center-of-gravity, and so forth.

Optimum baseline and peak start and stop points are computed, and a signal of interest is summed from integration start to integration stop. A baseline level is determined at each point of summation, and a value of the signal below the baseline level is subtracted from the summed signal, resulting in a net peak area under the curve. In an embodiment, the net peak area may be representative of a concentration of a constituent of the sample.

An alternative embodiment uses four parameters to specify the baseline start and stop points. In such an embodiment, the baseline start point is defined by two start parameters, and the baseline stop point is defined by two stop parameters. In an embodiment, the two start parameters may be defined as the corresponding offset relative to the peak maximum value plus and minus a first parameter offset. In such an embodiment, the two stop parameters may be defined as the corresponding offset plus and minus a second parameter value. The use of two parameters for each of the baseline start and stop points enable the baseline level to be calculated more precisely, using one of several possible methods including, but not limited to, an average of a region between each set of baseline points, a minimum of the region, a clipped average of the region, and so forth.

Application to Spectroscopy

Spectroscopy involves generating raw data, or inputs, as individual points consisting of some measure of light intensity relative to wavelength. For example, in absorbance spectroscopy, the light intensity is expressed as the log of the percent transmittance of light through a sample, and the wavelengths may be expressed in nanometers in the near-infrared range or in inverse centimeters, also called wavenumbers, for the mid-infrared range. For types of spectroscopy involving scattered light, such as Raman spectroscopy, the light intensity is measured as raw counts from the digitization of a detector signal. The wavelength is expressed as a wavenumber shift from an incident light source of a given wavelength that stimulated the Raman scattering. An example Raman spectrum is shown in FIG. 4.

Figure 4:
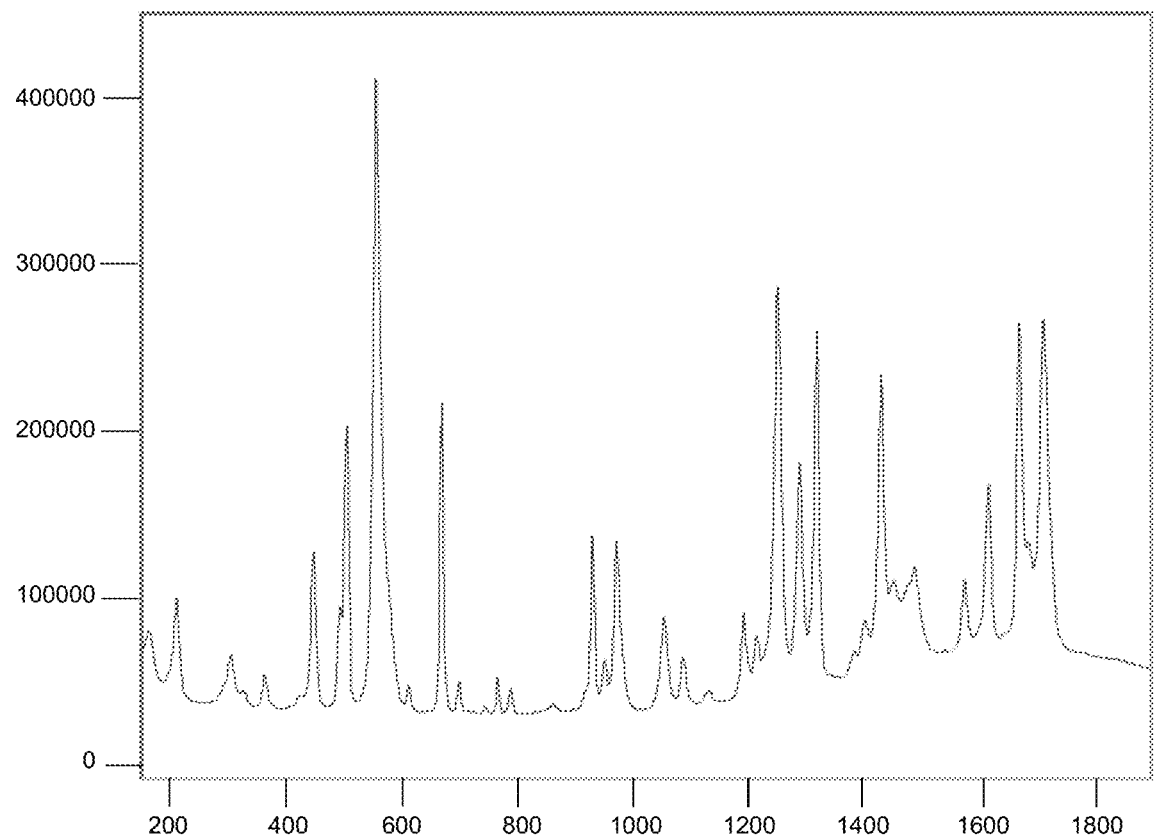
FIG. 4 shows an exemplary Raman spectrum with scattered light intensity on the y-axis and wavelength expressed as a Raman Shift in wavenumbers on the x-axis, according to the prior art.
Figure 5:
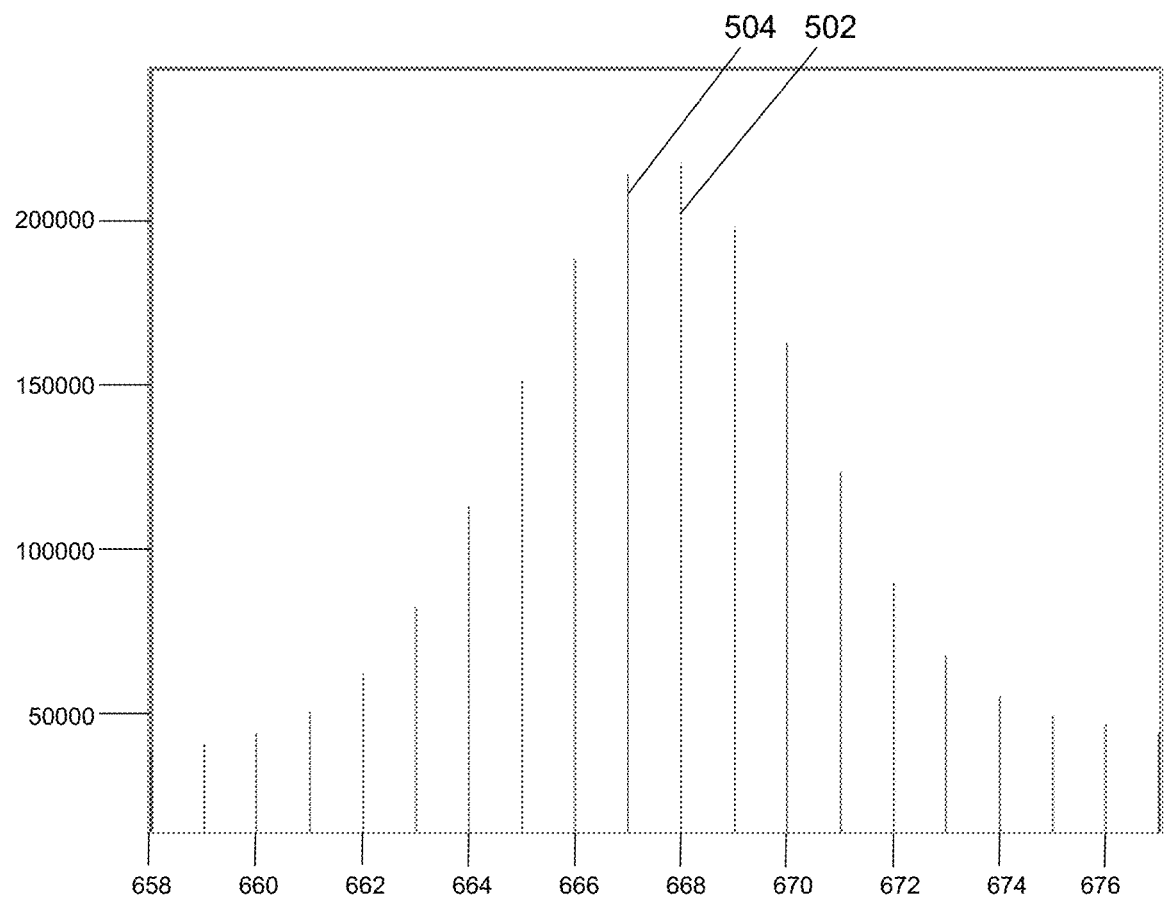
FIG. 5 shows an enlarged section of FIG. 1, showing individual data points consisting of an intensity value on the y-axis at each wavenumber value on the x-axis, according to the prior art.

Enlarging a small region of the example spectrum of FIG. 4 produces FIG. 5, where individual points, or inputs, can be seen. The peak may be a single spectroscopic quantity representing the light intensity given off by a specific number of molecules in a sample. The bigger the peak, the more molecules are present, which is the underlying basis of spectroscopic quantitation. However, as seen in FIG. 5, the raw data input has multiple points (i.e., 502, 504) defining the peak's shape. Each of these points is a measured quantity of detector response.

A conventional method for resolving a peak specific to spectroscopy involves the following steps. First, for a given peak, a nominal maximum is assumed for a particular molecular constituent. For example, for a methane peak, a nominal maximum of 2917 $cm^{-1}$ could be assumed. For this peak, nominal baseline parameters at absolute wavenumber positions are chosen on either side of the peak (e.g., 2910 $cm^{-1}$ and 2924 $cm^{-1}$). Nominal integration parameters, selected where the signal starts deviating from the baseline, are also chosen on either side of the peak (e.g., 2911 $cm^{-1}$ to 2923 $cm^{-1}$). Given these specified parameters, the signal is summed from the integration start to the integration stop points, and the baseline level is determined at each signal point. The summations below the baseline are subtracted from the signal values and the result is the net integration for that peak.

Figure 6:
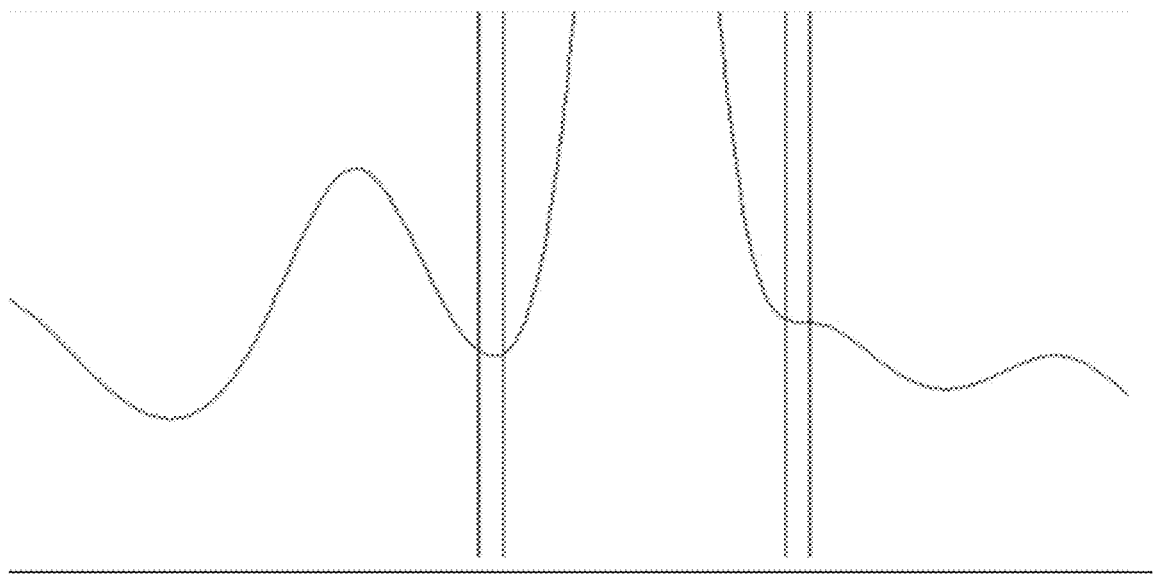
FIG. 6 illustrates an unresolved peak with precise baseline and integration limit requirements, according to the prior art.

Occasionally in spectroscopy, however, more than one type of molecule may result in a peak at similar locations. In such circumstances, the peak is said to be unresolved, and precise baseline and integration points are necessary to properly assess peak area for an individual molecular effect. FIG. 6 shows such an example. As evident in FIG. 6, in some cases, the integration and baseline parameters must be specified very precisely. While this is not difficult to do for a single spectrum, when a spectroscopic instrument is put online for an extended period, it is possible for the peak positions to shift slightly. When this happens, baseline and integration limits will remain constant, but the peak may shift relative to these limits to the point where the limits are no longer optimal.

Figure 7:
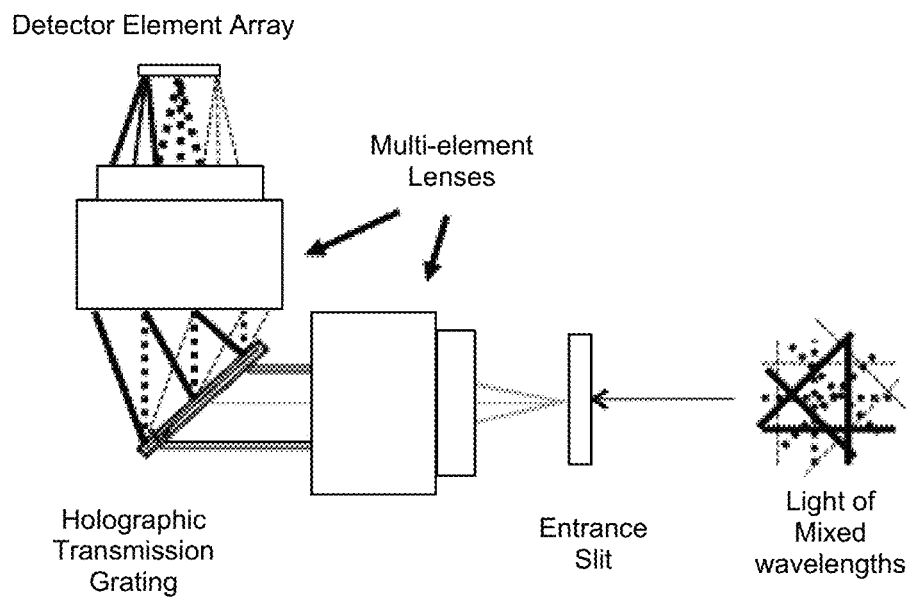
FIG. 7 depicts how a fixed grating and lens system is used to separate a mixture of different wavelengths of light into component wavelengths and to project these wavelengths onto a detector element array in a Raman spectrometer.

In many spectrometers, and especially in Raman spectrometers, a fixed grating and lens system is used to separate a mixture of different wavelengths of light into its component wavelengths, and these wavelengths are projected onto a detector element array, as depicted in FIG. 7. The intensity of the light at each detector element gives a mathematical description of the mixed wavelength light entering the spectrometer. The position of the detector array is fixed relative to the grating. Initially, a standard light source (such as neon), being a mixture of many well-known wavelengths of light, is used to establish which detector elements correspond to which wavelengths of light. While the detector array is at a nominally fixed position, over time, this position may change due to thermal expansion and contraction of the spectrometer. In addition, in Raman spectroscopy, the exact laser frequency used to generate the mixture of wavelengths determines where the photons appear on the detector array. Since the laser frequency can change over time, this frequency change may be another source of position error.

Figure 8:
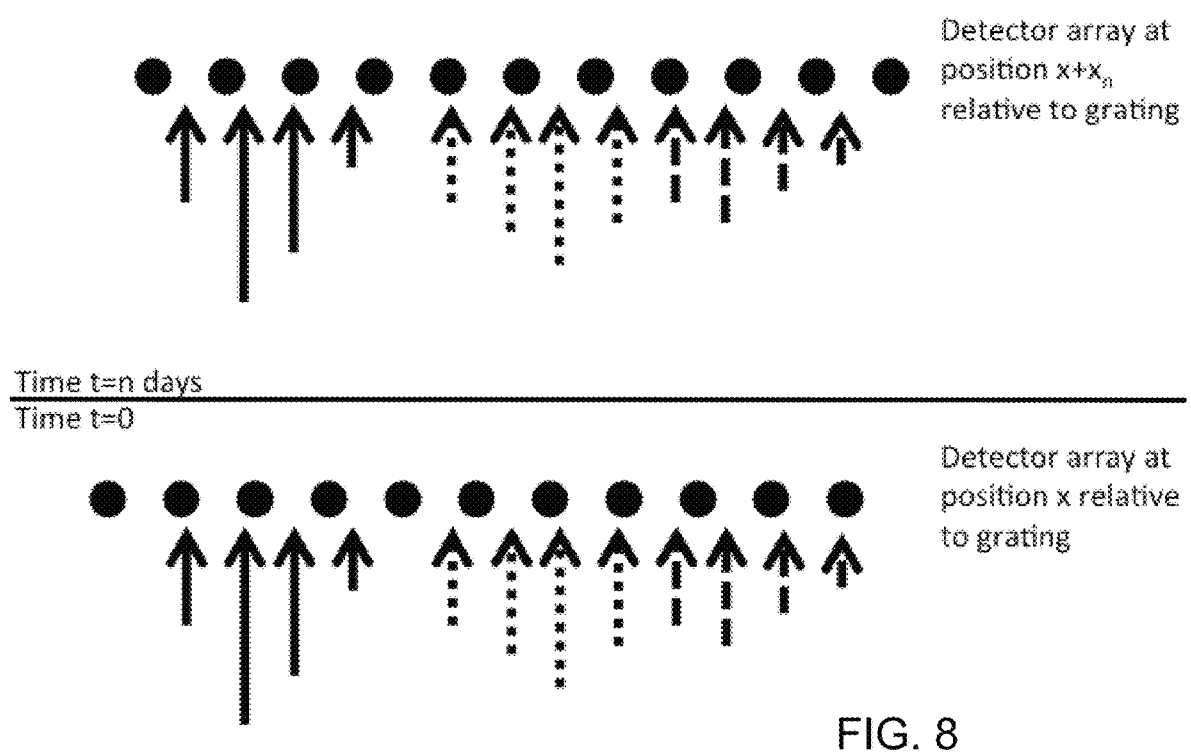
FIG. 8 depicts how individual wavelengths of light in the same position may not be measured accurately when a detector array has shifted from position x to position x+xn.

FIG. 8 shows the effect of this position error. At a time t=0, when the calibration of the x-position of the detector array relative to the grating has been performed very recently, three different colors of light are shown hitting the detector array at the known, correct positions. Note that because of the inability to focus each color on a particular detector element, it is common for a particular color to fall incident on several detector elements, which must later be integrated to determine the amount of that color in the light mixture. At some later time, n, the position of the detector array has changed relative to the grating. This change in position is indicated in FIG. 8 by the individual wavelengths of light remaining in the same position but the detector array has shifted from position x to position x+xn. If an integration algorithm summed together the same detector elements, regardless of the shift, then error would be introduced. Either the position of the array must be calibrated every time it is read, or else the integration algorithm must be flexible enough to adapt to the true, correct position. The methods of the present disclosure alleviates such difficulties.

The methods of the present disclosure may be described using an exemplary chemical species. The following example illustrates an embodiment of the method with respect to the relative integration of a methane peak. Nonetheless, the methods of the present disclosure are not limited in terms of target material to methane. In such an embodiment, the method includes:

1. Specifying parameters:
    a. Assume a nominal peak maximum (e.g., 2917 $cm^{-1}$);
    b. Specify a window to find the peak maximum in terms of wavelength or wavenumber (e.g., 2915 $cm^{-1}$ to 2919 $cm^{-1}$);
    c. Set a baseline start as the peak maximum less an appropriate offset (e.g., 7 $cm^{-1}$);
    d. Set a baseline stop as the peak maximum plus an offset (e.g., 7 $cm^{-1}$);
    e. Set an integration start as the peak maximum less an offset (e.g., 6 $cm^{-1}$); and
    f Set an integration stop as the peak maximum plus and an offset (e.g., 6 $cm^{-1}$);
2. Determining peak maximum using one of several known methods;
3. Calculating optimum baseline and peak parameters in absolute $cm^{-1}$;
4. Summing signal from integration start to integration stop;
5. Determining baseline level at each signal point; and
6. Determining a net peak area by subtracting a signal portion that is below the baseline at each signal point.

An alternative embodiment uses four baseline parameters as described herein.

Experimental Results

An experiment was designed that synthetically combined pure component spectra into mixtures. One set of 30 spectra was saved unaltered. The same set was shifted 1 cm$^{-1}$ to the high end of the spectrum and saved. The original set was also shifted 1 cm$^{-1}$ to the low end of the spectrum and saved. Consequently, 90 spectra total were produced, 30 each with peak positions at 2917 cm$^{-1}$ (unaltered), 2916 cm$^{-1}$ and 2918 cm$^{-1}$. A conventional algorithm and the relative algorithm, according to the present disclosure described herein, were both used to integrate the peak areas, yielding two sets of areas. A linear regression (univariate) was done on each set of areas, and a plot of the error (true-predicted) was made for each linear regression.

Figure 9:
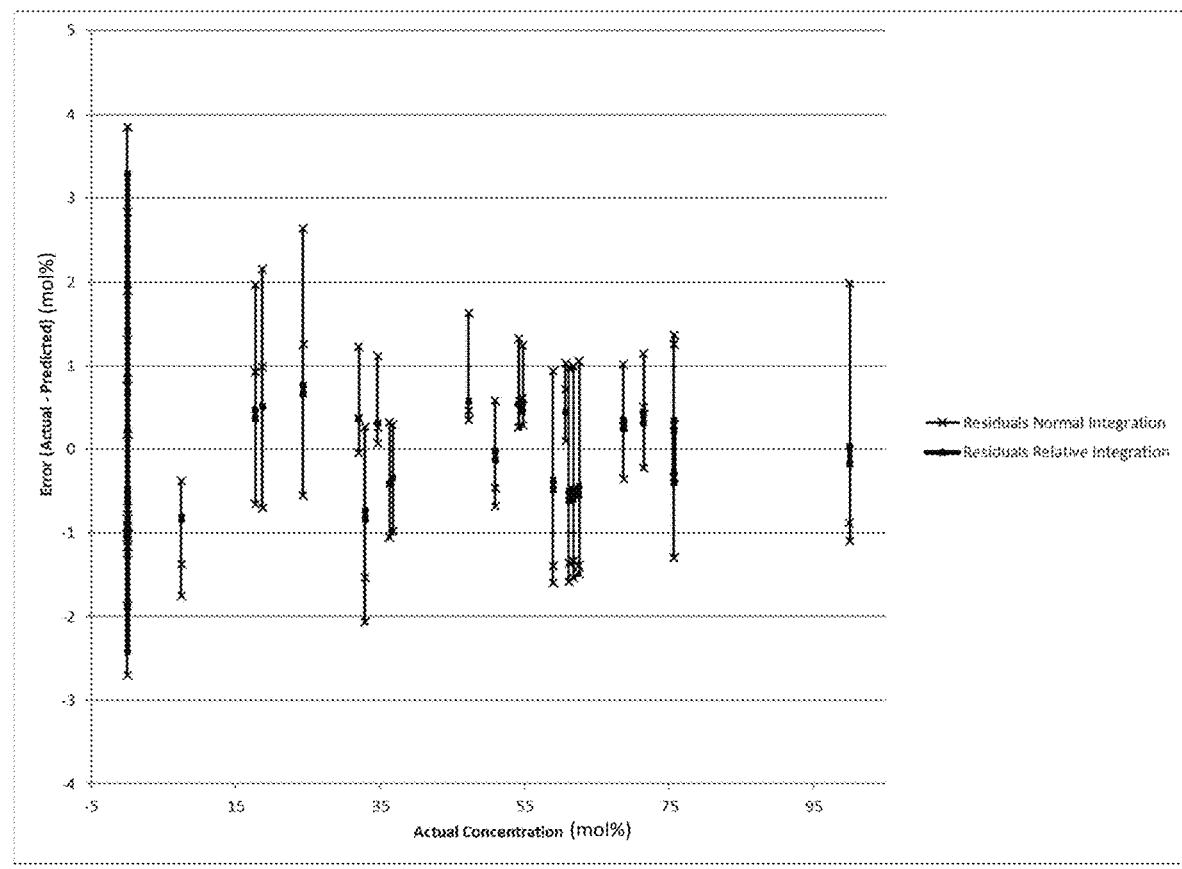
FIG. 9 is a plot of methane concentration residuals for normal integration versus relative integration for spectra with 1, 0 and −1 $cm^{-1}$ shifts.

FIG. 9 shows a plot of the range of errors for both sets of data. As evident from these plots, in most cases, the reduction in error is dramatic when using relative integration of the present disclosure. Note that the bars furthest to the left on the plot are for the case when there is no peak present (i.e., zero concentration). In this case, the center of the peak location window is used as location to start the offset when defining the parameters. The same behavior occurs if the peak is only a slight shoulder and no inflection point is available to define the peak top. The error is larger in both cases for zero concentration, only because univariate regression does not fully take into account correction for interferences.

While various embodiments of methods relative signal integration have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and still remain within the scope of the present disclosure.

The invention claimed is:

1. A method of improving the accuracy of a Raman spectrometer, comprising:
   providing a Raman spectrometer including:
      an optical grating operative to separate a Raman signal received from a sample into a Raman spectrum including at least one peak representative of a molecular constituent present in the sample;
      an optical detector having a plurality of detector elements configured to receive the Raman spectrum; and
      a processor operative to receive an electrical signal representative of the Raman spectrum from the optical detector in the form of a curve, the curve including the at least one peak having x- and y-coordinates, wherein the processor is configured to integrate the at least one peak; and
   using the spectrometer to perform the following operations:
      receiving data representative of a standard Raman spectrum for the molecular constituent including a nominal peak maximum y-value and an x-coordinate associated with the nominal peak maximum y-value;
      specifying a window relative to an x-axis that includes the x-coordinate of the nominal peak maximum y-value;
      defining a baseline start point on the x-axis as an x-coordinate of a peak less a first predetermined offset;
      defining a baseline stop point on the x-axis as the x-coordinate of the peak plus the first predetermined offset;
      defining an integration start point on the x-axis as the x-coordinate of the peak less a second predetermined offset;
      defining an integration stop point on the x-axis as the x-coordinate of the peak plus the second predetermined offset;
      receiving data representative of a sample Raman spectrum from the spectrometer, wherein the sample spectrum includes at least one sample peak associated with the molecular constituent present in the sample, and wherein the sample peak may have a relative shift of the x-axis with respect to the detector elements compared to the standard spectrum;
      determining an actual maximum y-value of the at least one sample peak of the sample spectrum and an x-coordinate associated with the actual maximum y-value;
      computing the baseline start point, the baseline stop point, the integration start point and the integration stop point using the actual maximum y-value for integrating the sample peak by subtracting and adding the first and second predetermined offsets as defined;
      computing a y-value of a curve including the sample peak and a y-value of a baseline at each of a plurality of points between the integration start point and the integration stop point;
      subtracting the baseline y-values from the y-values of the curve computed at each of the plurality of points between the integration start point and the integration stop point; and
      adding the results of the baseline subtractions to compute a net peak area representative of the molecular constituent present in the sample.

2. The method of claim 1, wherein the nominal peak maximum y-value and the x-coordinate associated with the nominal peak maximum y-value are based upon previously obtained data.

3. The method of claim 1, wherein the step of computing the actual maximum y-value of the at least one sample peak includes determining an absolute maximum.

4. The method of claim 1, wherein the step of computing the actual maximum y-value includes using a cubic spline or other curve-fitting method.

5. The method of claim 1, wherein the step of computing the actual maximum y-value includes using a center-of-gravity method.

6. The method of claim 1, further comprising:
   defining a lower baseline point using two start parameters;
   defining an upper baseline point using two stop parameters; and
   calculating the baseline start point and baseline stop point based on the lower baseline point and upper baseline point, respectively.

7. The method of claim 6, wherein the baseline start point and the baseline stop point are calculated as an average of a region between each set of start and stop parameters, respectively.

8. The method of claim 6, wherein the baseline start point and the baseline stop point are calculated as minimum of a region between each set of start and stop parameters, respectively.

9. The method of claim 6, wherein the baseline start point and the baseline stop point are calculated as a clipped average of a region between each set of start and stop parameters, respectively.

10. The method of claim 1, wherein the concentration of the molecular constituent present in the sample is determined from the net peak area.

11. An improved Raman spectrometer, comprising:
an input for receiving an optical Raman signal from a sample;
an optical grating operative to separate the Raman signal into a sample Raman spectrum including at least one peak representative of a molecular constituent present in the sample;
an optical detector having a plurality of detector elements configured to receive the sample spectrum; and
a processor configured to receive an electrical signal representative of the sample spectrum from the optical detector in the form of a curve including the at least one peak having x- and y-coordinates, wherein the processor is further configured to integrate the at least one peak by:
receiving data representative of a standard Raman spectrum including a nominal peak maximum y-value for the molecular constituent and the x-coordinate associated with the nominal peak maximum y-value;
specifying a window relative to an x-axis that includes the x-coordinate of the nominal peak maximum y-value;
defining a baseline start point on the x-axis as an x-coordinate of a peak less a first predetermined offset;
defining a baseline stop point on the x-axis as the x-coordinate of the peak plus the first predetermined offset;
defining an integration start point on the x-axis as the x-coordinate of the peak less a second predetermined offset;
defining an integration stop point on the x-axis as the x-coordinate of the peak plus the second predetermined offset;
receiving the electrical signal representative of the sample spectrum of the sample including the at least one peak of the molecular constituent, which may have a relative shift of the x-axis compared to the standard spectrum;
determining an actual maximum y-value of the at least one peak and an x-coordinate associated with the actual maximum y-value;
determining the baseline start point, the baseline stop point, the integration start point and the integration stop point using the actual maximum y-value for integrating the at least one peak by subtracting and adding the first and second predetermined offsets as defined;
determining a y-value of the curve including the at least one peak and a y-value of a baseline at each of a plurality of points between the integration start point and the integration stop point;
subtracting the baseline y-values from the y-values of the curve determined at each of the plurality of points between the integration start point and the integration stop point; and
adding the results of the baseline subtractions to determine a net peak area representative of the molecular constituent present in the sample.

12. The spectrometer of claim 11, wherein the data representative of the standard spectrum including the nominal peak maximum y-value for the molecular constituent and the x-coordinate associated with the nominal peak maximum y-value are based upon previously obtained data.

13. The spectrometer of claim 11, wherein the actual maximum y-value of the at least one peak is an absolute maximum.

14. The spectrometer of claim 13, wherein the processor is further configured to determine the actual maximum y-value using a cubic spline or other curve-fitting method.

15. The spectrometer of claim 13, wherein the processor is further configured to determine the actual maximum y-value of the peak using a center-of-gravity method.

16. The spectrometer of claim 11, wherein the processor is further configured to:
determine a lower baseline point with two start parameters and an upper baseline point with two stop parameters, and
calculate the baseline start point and baseline stop point based on the lower baseline point and upper baseline point, respectively.

17. The spectrometer of claim 16, wherein the baseline start point and the baseline stop point are calculated as an average of a region between each set of start and stop parameters, respectively.

18. The spectrometer of claim 16, wherein the baseline start point and the baseline stop point are calculated as minimum of a region between each set of start and stop parameters, respectively.

19. The spectrometer of claim 16, wherein the baseline start point and the baseline stop point are calculated as a clipped average of a region between each set of start and stop parameters, respectively.

20. The spectrometer of claim 11, wherein the concentration of the molecular constituent present in the sample is determined from the net peak area.

* * * * *